United States Patent [19]

Soederberg

[11] Patent Number: 4,895,040

[45] Date of Patent: Jan. 23, 1990

[54] MANUALLY ACTUATED ADJUSTING DEVICE FOR CONTROL VALVES

[75] Inventor: Richard Soederberg, Muehlacker, Fed. Rep. of Germany

[73] Assignee: Dr. Ing. h.c.F. Porsche AG, Fed. Rep. of Germany

[21] Appl. No.: 235,511

[22] Filed: Aug. 24, 1988

[30] Foreign Application Priority Data

Aug. 26, 1987 [DE] Fed. Rep. of Germany ....... 3728373

[51] Int. Cl.[4] ........................ G05G 1/00; B60K 26/00

[52] U.S. Cl. ........................................ 74/491; 180/315

[58] Field of Search ......................... 74/523, 525, 491; 248/118, 118.3; 297/411, 412; 180/315; 244/234; 414/5

[56] References Cited

U.S. PATENT DOCUMENTS

| | | | |
|---|---|---|---|
| 3,618,786 | 11/1971 | Fick | 414/5 |
| 4,012,014 | 3/1977 | Marshall | 244/234 |
| 4,069,720 | 1/1978 | Thor | 74/491 X |
| 4,200,166 | 4/1980 | Hansen | 180/315 |
| 4,702,520 | 10/1987 | Whisler et al. | 297/411 X |

FOREIGN PATENT DOCUMENTS 1108085 7/1958 Fed. Rep. of Germany .

*Primary Examiner*—Leslie A. Braun
*Assistant Examiner*—Janice E. Chartoff
*Attorney, Agent, or Firm*—Barnes & Thornburg

[57] ABSTRACT

A manually actuated adjusting device for control valves of a hydraulic lift mechanism of a vehicle, especially of a fork lift truck, includes a shifting lever with an armrest supporting a lower arm which is connected with an adjusting mechanism arranged below the same and consisting of a guide joint and support elements. A formed-out support surface extends over the entire length of the lower arm which terminates at one end in an approximately vertical shifting lever that is formed-in into the armrest. Within the area of its transition to the support surface, the latter includes a trough-shaped recess formed out of the plane of the support surface.

17 Claims, 3 Drawing Sheets

MANUALLY ACTUATED ADJUSTING DEVICE FOR CONTROL VALVES

BACKGROUND AND SUMMARY OF THE INVENTION

The present invention relates to a manually actuated adjusting device for control valves of a hydraulic lift mechanism of a vehicle, especially of a fork lift stacker which includes a shifting lever with an armrest supporting the lower arm.

A transmission shifting device for motor vehicles is disclosed in the DE-AS 11 08 085 which includes a shifting lever connected with a tubular member carrying an armrest that is secured at a pivot lever and acts on the vehicle transmission by way of a linkage. The armrest is provided with a flat support surface and extends over a part of the tubular member and thus supports the lower arm of the actuating person only partially, whereby no rest, respectively, support for the hand, respectively, the hand joint is provided between the shifting lever handle and the end of the armrest. A secured support of the lower arm is not assured, especially in case of shocks or vibrations.

It is the object of the present invention to provide a manually actuated adjusting device which enables a fatigue-free actuation of a shifting lever safe in every driving and standing situation of the stacker. The shifting lever is also to have such an adjusting mechanism which assures a stable support with respect to the vehicle body as also a movement possibility of the shifting lever in the longitudinal and transverse directions.

The underlying problems are solved according to the present invention in that the armrest is connected with an adjusting mechanism disposed at the bottom side thereof and consisting of a guide joint and of support elements and includes a formed-out support surface extending on the top of the armrest over the entire length of the lower arm which terminates at the end in an approximately upright shifting lever that is formed-in into the armrest and includes within the area of its transition to the support surface a trough-shaped recess formed out of the plane of the support surface.

The advantages principally attained with the present invention reside in that a recess uninterruptedly supporting the lower arm of the operating person and far-reachingly matched to the shape of the lower arm is provided in the armrest by the one-piece molded part formed by the armrest and the shifting lever and an optimum support from the elbow joint to the hand is achieved thereby. This offers the advantage that the lower arm can be supported during the operation of the shifting lever in such a manner that during the working phase, no essential movement takes place in the hand joint and therewith no additional stressing occurs which would cause a disadvantageous fatiguing. For the continuous support of the lower arm in the hand joint area, a trough-shaped rounded-off area for the hand is additionally provided in the support surface of the armrest within the area of the hand, especially in the transition to the shifting lever so that the hand can be well supported and has a rigid abutment on the armrest. Also a support surface for the hand is provided in front of the shifting lever.

Thus, the entire lower arm is securely held fast on the arm-rest in every position, especially during shocks and vibrations. Additionally, the armrest further includes outwardly disposed drawn-up edges which delimit the recess in the armrest. For matching the armrest to the size of the operating person, the adjusting mechanism is additionally connected with a height-adjusting device so that an optimal adaptation to every operating person of the stacker is realizable.

An adjusting mechanism with a guide joint and support elements is provided below the armrest part of the shifting lever. They are so arranged that they are covered by the armrest part, respectively, surrounded by a bellows.

Actuating keys, respectively switches, are provided in the handle surface of the shifting lever which, for the simple actuation, are coordinated to the corresponding fingers of the hand of the actuating person.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
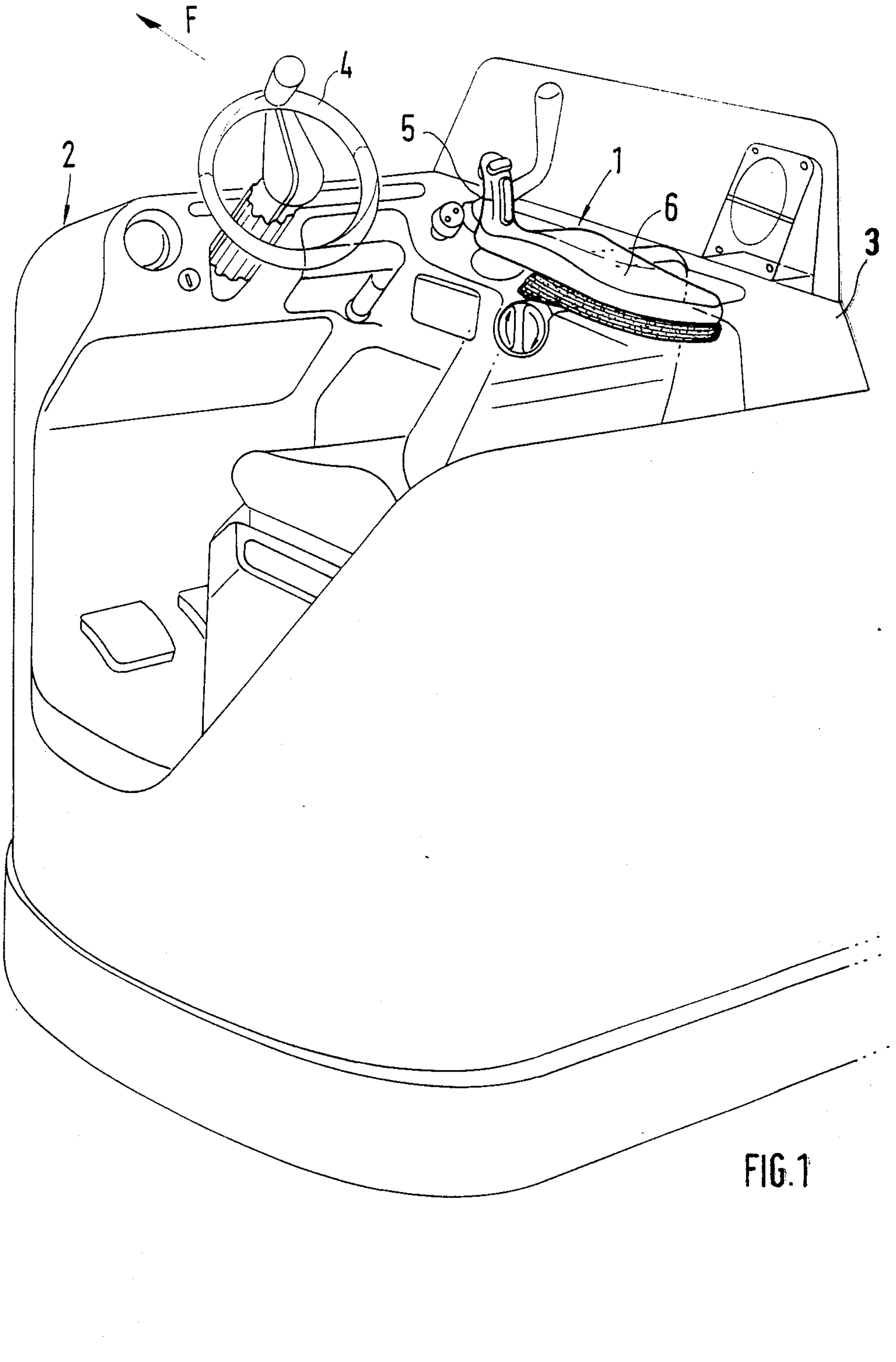
FIG. 1 is a perspective view of a driver stand of a fork lift truck with an adjusting device in accordance with the present invention.

Referring now to the drawing wherein like reference numerals are used throughout the various views to designate like parts, the adjusting device generally designated by reference numeral 1 is arranged in a driver stand of a stacker generally designated by reference numeral 2 in a side wall of the body 3 and is provided to the right adjacent a steering wheel 4, as viewed in the driving direction F and as shown more fully in FIG. 1. This adjusting device 1 includes an approximately vertically oriented shifting lever 5 which, together with an approximately horizontally supported armrest 6, is constructed as a single molded part. An adjusting mechanism generally designated by reference numeral 8, which is connected with a bottom side 7 of the armrest 6 (FIG. 3), is surrounded by a bellows.

Figure 2:
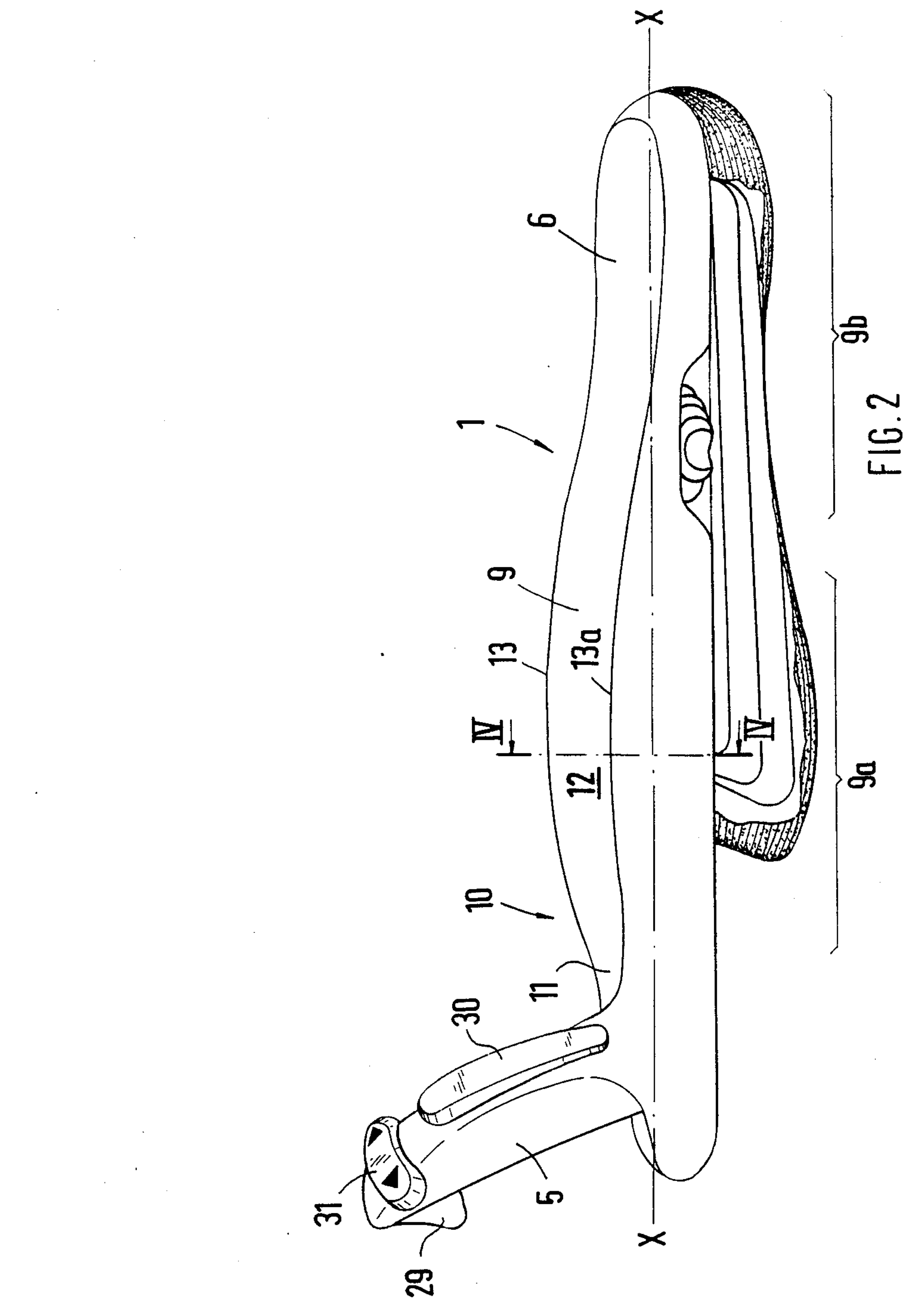
FIG. 2 is a side elevational view of the adjusting device in accordance with the present invention.
Figure 4:
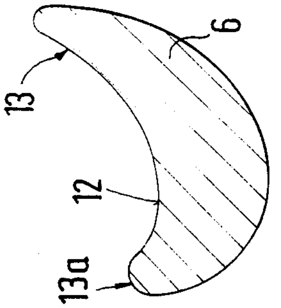
FIG. 4 is a cross-sectional view through the adjusting device taken along line IV—IV of FIG. 2.
Figure 5:
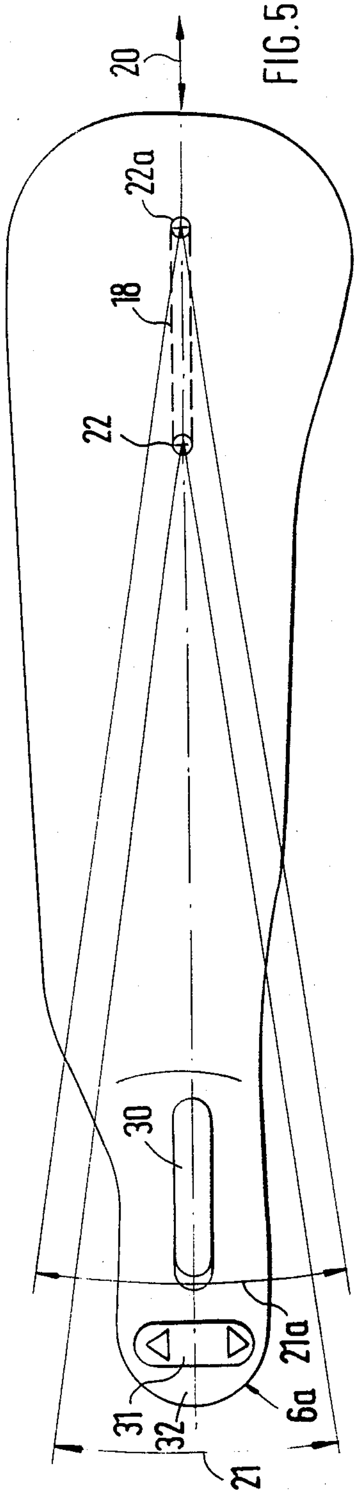
FIG. 5 is a plan view on the adjusting device with its adjusting areas in the longitudinal and transverse directions.

The armrest 6 includes a formed-out support surface 9 extending over the entire length of the lower arm of an operating person—from the elbow joint to the actuating hand. The support surface 9 passes over into the shifting lever 5 so that the surface 9 is continuous without transition and a unitary molded part results therefrom with integrated shifting lever 5 and armrest 6. A trough-shaped recess 11 formed out of the plane X—X is formed within the transition area 10 (FIG. 2) to the shifting lever 5 so that the trough-shaped recess provides a fixed lower support for the actuating hand. For securing the lateral position of the lower arm, the armrest 6 is provided with a longitudinally extending recess 12 (FIG. 4) which becomes deeper in the direction toward the shifting lever 5 and includes an outwardly disposed, drawn-up edge 13 formed-on along the longitudinal side which is arranged in a partial area ahead of the shifting lever 5. The edge 13 extends arcuately shaped and corresponds with a further drawn-up edge 13*a* which is arranged at the oppositely disposed longitudinal side of the support surface 9 and delimits the same. The longitudinally extending recess 12 is disposed approximately in the center area 9*a* of the support surface 9 and is constructed deeper than in the rearwardly terminating area 9*b* of this surface 9 (FIG. 2). In particular, the recess 12 is matched to the anatomic shape of the lower arm of the actuating person so that the lower arm assumes an optimal support and bedding on the armrest 6. For purposes of support of the hand of the actuating person gripping the shifting lever 5, a support surface 32 (FIG. 5) is provided at the free forward end 6*a* of the armrest 6.

Figure 3:
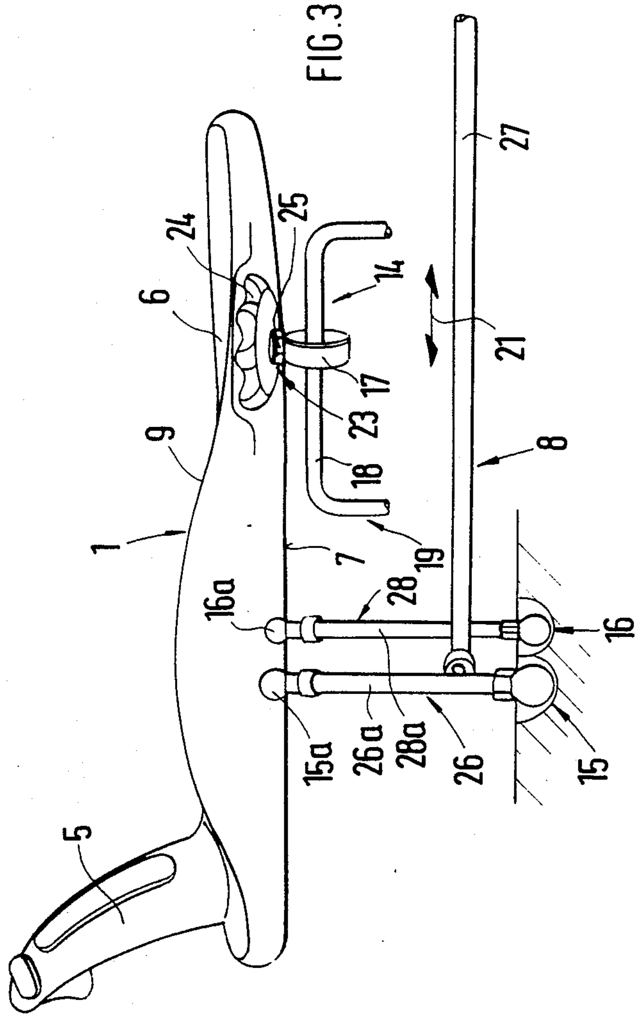
FIG. 3 is a side elevational view of the arrangement with an adjusting mechanism in accordance with the present invention.

The adjusting mechanism 8 essentially includes a guide joint 14 and support elements 26 and 28 which consist of support rods 26*a* and 28*a* that are supported by way of joints 15, 15*a* and 16, 16*a* (FIG. 3). The guide joint 14 includes a retaining element 19 fixed with respect to the body and a slide ring 17 connected with the armrest 6. The retaining element 19 consists of a U-shaped member 19*a* extending in the longitudinal direction of the armrest 6 which includes a guide rod 18 extending parallel to the lower side 7 of the armrest 6. The slide ring 17 is guided on this rod 18 and thus the armrest 6 together with the shifting lever 5 is displaceably and pivotally retained on this rod 18. The adjusting device 1 is pivotal within limits in the longitudinal directions 20 by way of the slide ring 17 and is also pivotal on the guide rod 18 in the transverse directions 21 and 21*a* by the pivot joints 22, 22*a* formed by the slide ring 17, as shown more fully in FIG. 5. Joint points can also be formed between these joint points 22 and 22*a* which make possible corresponding pivot movements of the adjusting device 1.

The slide ring 17 is additionally connected with a height-adjusting device 23 which includes an adjusting ring 24 retained at the armrest 6 that is rotatably retained on a threaded bolt 25 of the slide ring 23 which is not illustrated in detail.

The support joints 15 and 16 between the shifting lever 5 and the guide joint 14 are arranged on the side of the body whereby the forwardly disposed support joint 15 is coordinated to the first support rod 26*a* which supports the armrest in a further joint 15*a* and which is connected with a control rod 27 for the actuation of control valves. The second support rod 28 is supported by way of the joint 16 on the side of the body and by way of the further joint 16*a* on the side of the armrest.

The shifting lever 5 is so constructed that oppositely disposed actuating keys 29 and 30 can be arranged in its circumferential gripping surfaces, whereby a further actuating switch 31 can be provided in the end face of the shifting lever (FIG. 2).

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A manually actuated adjusting device for control valves of a hydraulic lift mechanism of a vehicle, comprising an armrest means supporting a lower arm, the armrest means being operatively connected with an adjusting means disposed below the armrest means and including a guide joint means and support elements, the armrest means being provided with a formed-out support surface extending on its top side over substantially the entire length of the lower arm which terminates at the end in an approximately upright shifting lever means that is integrally formed with the armrest means and includes within the area of its transition to the support surface a trough-shaped recess formed out of the plane of the support surface, whereby substantially the entire length of an operator's lower arm between the elbow and the hand is securely supported during shifting operations.

2. A manually actuated adjusting device for control valves of a hydraulic lift mechanism of a vehicle, comprising an armrest means supporting a lower arm, the armrest means being operatively connected with an adjusting means disposed below the armrest means and including a guide joint means and support elements, the armrest means being provided with a formed-out support surface extending on its top side over substantially the entire length of the lower arm which terminates at the end in an approximately upright shifting lever means that is formed-in into the armrest means and includes within the area of its transition to the support surface a trough-shaped recess formed out of the plane of the support surface, wherein the guide joint means includes retaining means fixed relative to a vehicle body part and a slide ring means connected with the armrest means.

3. An adjusting device according to claim 2, wherein t he retaining means consists of a U-shaped member aligned substantially in the longitudinal direction of the armrest means with a guide rod extending substantially parallel to the bottom side of the armrest means, and wherein the slide ring means is guided on the guide rod and the armrest means together with the shifting lever means is displaceably and pivotally retained on the guide rod.

4. An adjusting device according to claim 3, wherein the slide ring means is operatively connected with a height-adjusting means which includes an adjusting ring retained at the armrest means, and wherein the adjusting ring is rotatably arranged on a threaded bolt of the slide ring means.

5. An adjusting device according to claim 4, wherein the support elements include substantially vertically oriented support rods arranged between the shifting lever means and the guide joint means, the free ends of the support rods facing the body being supported in joints and the free ends of the support rods facing the armrest means being supported in further joints.

6. An adjusting device according to claim 5, wherein the shifting lever means includes actuating keys at its circumferential gripping surface as well as an actuating switch at its end face.

7. An adjusting device according to claim 5, wherein the support surface includes a trough-shaped, rounded-out recess extending in the longitudinal direction of the armrest means and substantially matched to the lower arm, the recess being provided at its one longitudinal side partially with an outwardly disposed drawn-up edge.

8. An adjusting mechanism according to claim 7, wherein the edge extends arcuately shaped and is arranged corresponding to a further drawn-up edge delimiting the oppositely disposed longitudinal side of the support surface.

9. An adjusting mechanism according to claim 8, wherein the longitudinally extending recess is constructed deeper approximately in the center area of the support surface than in the rearwardly terminating area of the support surface.

10. An adjusting mechanism according to claim 9, wherein the shifting lever means includes in the base area a further support surface formed-on at the forward free end of the armrest means.

11. An adjusting device according to claim 2, wherein the slide ring means is operatively connected with a height-adjusting means which includes an adjusting ring retained at the armrest means, and wherein the adjusting ring is rotatably arranged on a threaded bolt of the slide ring means.

12. An adjusting device according to claim 1, wherein the support elements include substantially vertically oriented support rods arranged between the shifting lever means and the guide joint means, the free ends of the support rods facing a vehicle body part being supported in joints and the free ends of the support rods facing the armrest means being supported in further joints.

13. An adjusting device according to claim 1, wherein the shifting lever means includes actuating keys at its circumferential gripping surface as well as an actuating switch at its end face.

14. An adjusting device according to claim 1, wherein the support surface includes a trough-shaped, rounded-out recess extending in the longitudinal direction of the armrest means and substantially matched to the lower arm, the recess being provided at its one longitudinal side partially with an outwardly disposed drawn-up edge.

15. An adjusting mechanism according to claim 14, wherein the edge extends arcuately shaped and is arranged corresponding to a further drawn-up edge delimiting the oppositely disposed longitudinal side of the support surface.

16. An adjusting mechanism according to claim 14, wherein the longitudinally extending recess is constructed deeper approximately in the center area of the support surface than in the rearwardly terminating area of the support surface.

17. An adjusting mechanism according to claim 1, wherein the shifting lever means includes in the base area a further support surface formed-on at the forward free end of the armrest means.

* * * * *